J. W. ROPER.
HORSESHOE.
APPLICATION FILED FEB. 10, 1908.
900,959.  Patented Oct. 13, 1908.
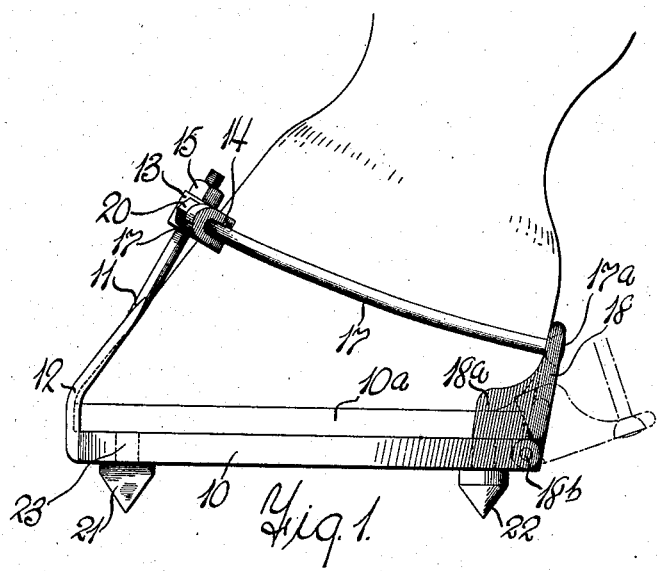
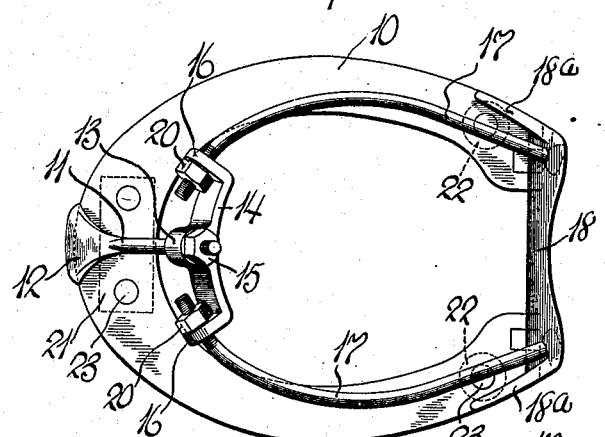
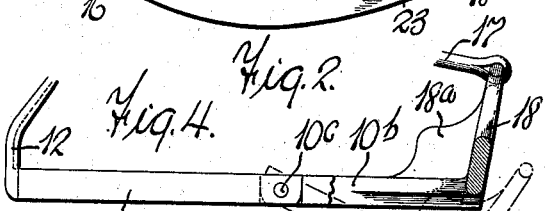
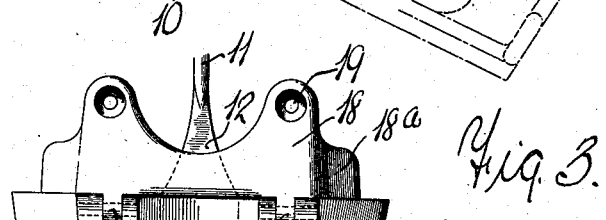
Witnesses:
Ralph Lancaster.
Frank L. Stubbs.
Inventor
Joseph Welwood Roper.
By his Attorney
W. B. Hutchinson.

UNITED STATES PATENT OFFICE.

JOSEPH WELWOOD ROPER, OF EAST ORANGE, NEW JERSEY.

HORSESHOE.

No. 900,959.           Specification of Letters Patent.         Patented Oct. 13, 1908.

Application filed February 10, 1908. Serial No. 415,011.

*To all whom it may concern:*

Be it known that I, JOSEPH WELWOOD ROPER, of East Orange, county of Essex, and State of New Jersey, have invented a new and useful Improvement in Horseshoes, of which the following is a full, clear, and exact description.

My invention relates to improvements in horse-shoes, but more especially to such shoes as are adapted to slip on over the ordinary horse-shoe for emergency uses. It often happens, and especially in city places, that the streets become icy or slippery, and the horse is unable to pull his load, and sometimes can only walk with difficulty.

The object of my invention is to provide a simple form of horse-shoe which can be provided with sharp calks and which can be quickly and securely fastened to the hoof over the ordinary shoe to enable the horse to get a good footing.

I am aware that attempts have been made to fasten shoes to the horse's hoofs without the use of nails, but my invention is not intended to take the place of the ordinary shoes, although it can, if necessary, be applied to the hoof whether or not the ordinary shoe is present. Shoes of this general nature have heretofore been rather complicated, difficult to apply, and insecure when in position, but my invention is intended to obviate these difficulties and produce a shoe which can be easily adjusted, which will prevent slipping, and which will be absolutely secure on the hoof.

Reference is to be had to the accompanying drawings forming a part of this specification, in which similar reference characters indicate corresponding parts in all the views.

Figure 1 is a side elevation of the shoe embodying my invention, the same being shown applied to the hoof of a horse; Fig. 2 is a plan view of the shoe; Fig. 3 is a broken rear elevation, and Fig. 4 is a broken side elevation of a slightly modified form of the shoe.

The shoe 10 is of the usual shape, and can be made in any preferred design or of a shape to fit hoofs of various kinds, and it has at the toe a fastening strap 11 which extends up in a direction generally parallel with the hoof and is preferably widened at the toe as shown at 12, so as to get a better bearing surface. The strap 11 extends upward through a thickened part 13 of a yoke 14 which is adapted to fit against the foot of the horse at a point some distance above the bottom, and the strap 11 can be fastened in place by a nut 15 which, by being turned down, will serve to secure the yoke firmly in position and crowd it down upon the hoof, this being easily done as the hoof widens toward the bottom. The yoke 14 is provided with flanges 16 which receive the threaded ends of the side straps 17, which extend rearward and have their rear ends $17^a$ preferably formed into heads which enter counter sunk holes 19 in the heel flange 18, this latter being provided with side members $18^a$ which fit against the sides of the hoof and prevent any lateral displacement of the shoe. In order that the heel flange may be easily adjusted, it is secured to the heel of the shoe 10 by a hinge joint $18^b$. When the shoe is to be applied, it is slipped on from the front, the heel flange turned up, the ends of the side straps 17 inserted through the holes in the flanges 16, and nuts 20 are used to tighten up the side straps; at the same time the nut 15 can be tightened, and it will be seen that by tightening the nuts 15 and 20, the shoe is very securely fastened from both the toe and heel to the hoof, and it is also prevented from being laterally displaced.

In Fig. 4 I have shown a slight modification of the arrangement described, in which the rear portion of the shoe $10^b$ is hinged to the body portion as shown at $10^c$, this working the same as if the flange 18 were hinged, but in this form just referred to the flange 18 is rigid on the part $10^b$. In this style of shoe I have shown the side straps 17 hinged to the flange 18. In either form I prefer to use removable calks 21 and 22, and any preferred form of calk can be used. As illustrated the calks have rivets 23 extending into holes in the shoe where they are secured.

From the foregoing description it will be seen that I have devised a shoe which can be very quickly and securely adjusted, and which is guarded against displacement either backward, forward, or laterally, and is also held tight by means of the fastening straps referred to. Obviously the precise connection between the straps 11, 17, and the other parts of the shoe can be changed without affecting the principle of the invention. Also the yoke 14, which is really a toe piece as it fits over the toe portion of the hoof, can be changed in its shape without affecting the invention in any way.

Having thus fully described my invention, I claim as new and desire to secure by Letters Patent:—

1. A horse shoe having an upwardly extending toe strap rigid on the shoe, said strap having a screw threaded upper end, a toe piece movable up and down on the toe strap, a nut for fastening the toe piece to the strap, a heel flange arranged to embrace the heel and sides of a hoof, and side straps extending from the heel flange upwardly and forwardly to the toe piece with which they have an adjustable connection.

2. A horse shoe having a toe strap extending upwardly from and rigid on the toe of the shoe, a toe piece slidable up and down on the strap and having a screw and nut adjustment thereon, a relatively low heel flange hinged to the heel of the shoe and embracing the back and sides of the hoof, and side straps connected with the heel flange and extending upward and forward to the toe piece with which they are adjustably connected.

3. A horse shoe having a toe strap rigid thereon and extending upward from the toe of the shoe, said toe strap having a screw threaded upper end, a toe piece having outwardly extending flanges thereon, said toe piece being movable up and down on the toe strap, a fastening nut to secure the toe piece, side straps extending forward and upward from the heel portion of the shoe, said straps entering the aforesaid flanges on the toe piece, and fastening devices to secure the side straps to the toe piece.

JOSEPH WELWOOD ROPER.

Witnesses:
WARREN B. HUTCHINSON,
WILLIAM S. DENISON.